United States Patent
Murakowski et al.

(10) Patent No.: US 10,690,850 B2
(45) Date of Patent: Jun. 23, 2020

(54) INTEGRATED VECTOR MODULATOR

(71) Applicant: Phase Sensitive Innovations, Inc., Newark, DE (US)

(72) Inventors: Janusz Murakowski, Bear, DE (US); Timothy Creazzo, Newark, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 0 days.

(21) Appl. No.: 16/044,427

(22) Filed: Jul. 24, 2018

(65) Prior Publication Data

US 2019/0025507 A1    Jan. 24, 2019

Related U.S. Application Data (60) Provisional application No. 62/536,110, filed on Jul. 24, 2017.

(51) Int. Cl.
  *G02B 6/126*    (2006.01)
  *G02F 1/03*    (2006.01)
  (Continued)

(52) U.S. Cl.
  CPC ........... *G02B 6/126* (2013.01); *G02F 1/0018* (2013.01); *G02F 1/035* (2013.01); *G02F 1/0316* (2013.01);
  (Continued)

(58) Field of Classification Search
  CPC .......... G02B 6/126; G02B 2006/12147; G02F 1/0316; G02F 1/0018; G02F 1/035; G02F 2203/06; G02F 2001/0154
  See application file for complete search history.

(56) References Cited

U.S. PATENT DOCUMENTS

| | | | | |
|---|---|---|---|---|
| 7,408,693 | B2 * | 8/2008 | Kissa | G02F 1/0123 359/245 |
| 2013/0209023 | A1 | 8/2013 | Prosyk | |
| 2015/0286108 | A1 * | 10/2015 | Prosyk | G02F 1/225 385/3 |

OTHER PUBLICATIONS

J. Tang, S. Yang and A. Bhatranand, "Electro-optic barium titanate waveguide modulators with transparent conducting oxide electrodes," 2009 Conference on Lasers & Electro Optics & The Pacific Rim Conference on Lasers and Electro-Optics, Shanghai, 2009, pp. 1-2. (Year: 2009).*

(Continued)

*Primary Examiner* — Ryan A Lepisto
*Assistant Examiner* — Erin D Chiem
(74) *Attorney, Agent, or Firm* — Muir Patent Law, PLLC (57) ABSTRACT

A method and apparatus for simultaneously modulating at least two distinct characteristics of an optical carrier propagating in an optical waveguide with at least two electrical signals includes transmitting an optical beam that includes the optical carrier into an optical waveguide defined in electro-optic material, and applying the at least two electrical signals at the same time to generate an electric field in the optical waveguide. The instantaneous predominant orientation of the electric field in the optical waveguide generated by the applied at least two electrical signals depends on the relative instantaneous values of the applied electrical signals. The at least two distinct characteristics of the optical carrier propagating in the optical waveguide are simultaneously and independently modulated depending on the predominant orientation of the electric field in the optical waveguide as a result of the application of the at least two electrical signals.

15 Claims, 4 Drawing Sheets

(51) Int. Cl.
    *G02F 1/00*           (2006.01)
    *G02F 1/035*         (2006.01)
    *G02B 6/12*           (2006.01)
    *G02F 1/015*         (2006.01)

(52) U.S. Cl.
    CPC .............. *G02B 2006/12147* (2013.01); *G02F 2001/0154* (2013.01); *G02F 2203/06* (2013.01)

(56) References Cited

OTHER PUBLICATIONS

Tanaka, Tetsuro, "Barium Titanate Ceramics and their applications" Bulletin of the Institute for Chemical Research, Kyoto University 1954, 32(2):pp. 43-53 (Year: 1954).*

* cited by examiner

INTEGRATED VECTOR MODULATOR

CROSS-REFERENCES TO RELATED APPLICATIONS

This application is a non-provisional application that claims the priority of U.S. Provisional Application No. 62/536,110 filed on Jul. 24, 2017, the disclosure of which is hereby incorporated by reference in its entirety.

FIELD OF TECHNOLOGY

Embodiments of the invention relate to modulation of optical carrier signals.

BACKGROUND

An optical beam may be characterized with amplitude, wavelength, phase, and polarization. In an electro-optic modulator, one or more of these parameters are affected, or modulated, by an electrical signal. Accordingly, if the electrical signal modulates the amplitude of the optical beam, one may speak of amplitude modulation. Similarly, if the electrical signal modulates the phase of the optical beam, one may speak of phase modulation. To effect such modulation, one may exploit nonlinear properties of certain materials, such as lithium niobate (LNB), which changes its optical properties according to the applied electric field. In particular, the application of electric field modifies the refractive index of LNB. The phenomenon of changing the refractive index proportionally to the strength of the applied electric field is known as Pockels effect. Modulators based on Pockels effect, including those made of LNB, are in wide-spread use in, e.g., long-haul telecommunication that uses optical beams guided in optical fibers to convey information in digital form. Such modulators are also used in the field of radio-frequency (RF) photonics to impose analog RF signals onto optical beams for transmission and/or processing. In these applications, the optical beam of a specific wavelength and a specific polarization may be confined to a single-mode waveguide when traversing the modulator and being subject to external RF signal for modulation. When a single straight waveguide patterned in LNB is used, phase modulation of the optical beam may ensue. By properly configuring the waveguides in LNB, e.g. in the form of a Mach-Zehnder interferometer, where the phase in one or both arms is modulated by external signals, amplitude modulation may be achieved. Nesting and/or concatenation of the Mach-Zehnder modulators and/or phase modulators may enable arbitrary phase-amplitude modulation.

However, commonly, at the lowest level, a single electrical signal modulates a single optical beam having a fixed polarization and propagating in a single-mode waveguide patterned in electro-optic material such as LNB.

SUMMARY

The exemplary embodiments presented herein describe novel approaches to modulating optical beams with electrical signals in electro-optic materials. Specifically, the exemplary embodiments may provide for the simultaneous modulation of two optical beams differing in polarization and propagating in a single waveguide, with two independent electrical signals. Alternatively, two independent electrical signals may simultaneously modulate two characteristics of a single optical beam, for example phase and polarization. Where two optical beams are used, an implementation of such a modulator may yield the modulation of the relative phase between the two optical beams and the modulation of the beams' polarization. The latter, when combined with a polarizer, may yield the amplitude modulation of the combined beam. As a result, such a device may implement full vector modulation of a pair of optical beams with a pair of electrical signals, including the modulation of relative phase between the optical beams and the overall amplitude.

The vector-modulation functionality of the device disclosed herein, may find application in a transmitter, such as the transmitter described in PCT/US2017/014205, filed Jan. 19, 2017, and which is incorporated herein in its entirety by reference, which relies on several separate devices to achieve vector modulation of a pair of optical beams. The reduction of the number of elements to achieve the same functionality may be of practical value.

The principle of operation of the integrated vector modulator presented herein may rely on the anisotropy of the electro-optic material. In particular, some electro-optic materials may exhibit birefringence, that is the dependence of the index of refraction on the polarization and on the direction of propagation of light through the material. In addition, the electro-optic effect characterizing the material may be anisotropic, i.e., the change in the index of refraction may depend on the direction of the applied electric field, as well as on the polarization and on the direction of propagation of the optical beam, in addition to the dependence on the electric-field strength. Notably, known electro-optic materials, such as LNB, exhibit both birefringence and electro-optic anisotropy.

BRIEF DESCRIPTION OF THE DRAWINGS

The accompanying drawings are included to provide a further understanding of exemplary device, system, and method embodiments of the invention. In the drawings.

DETAILED DESCRIPTION

A vector modulator may control or modulate the polarization state and the phase offset between two optical beams launched into two orthogonal modes of the device. The modulation frequency may be in the RF region of the electromagnetic spectrum, generally understood to lie between 3 kHz and 300 GHz.

Figure 1:
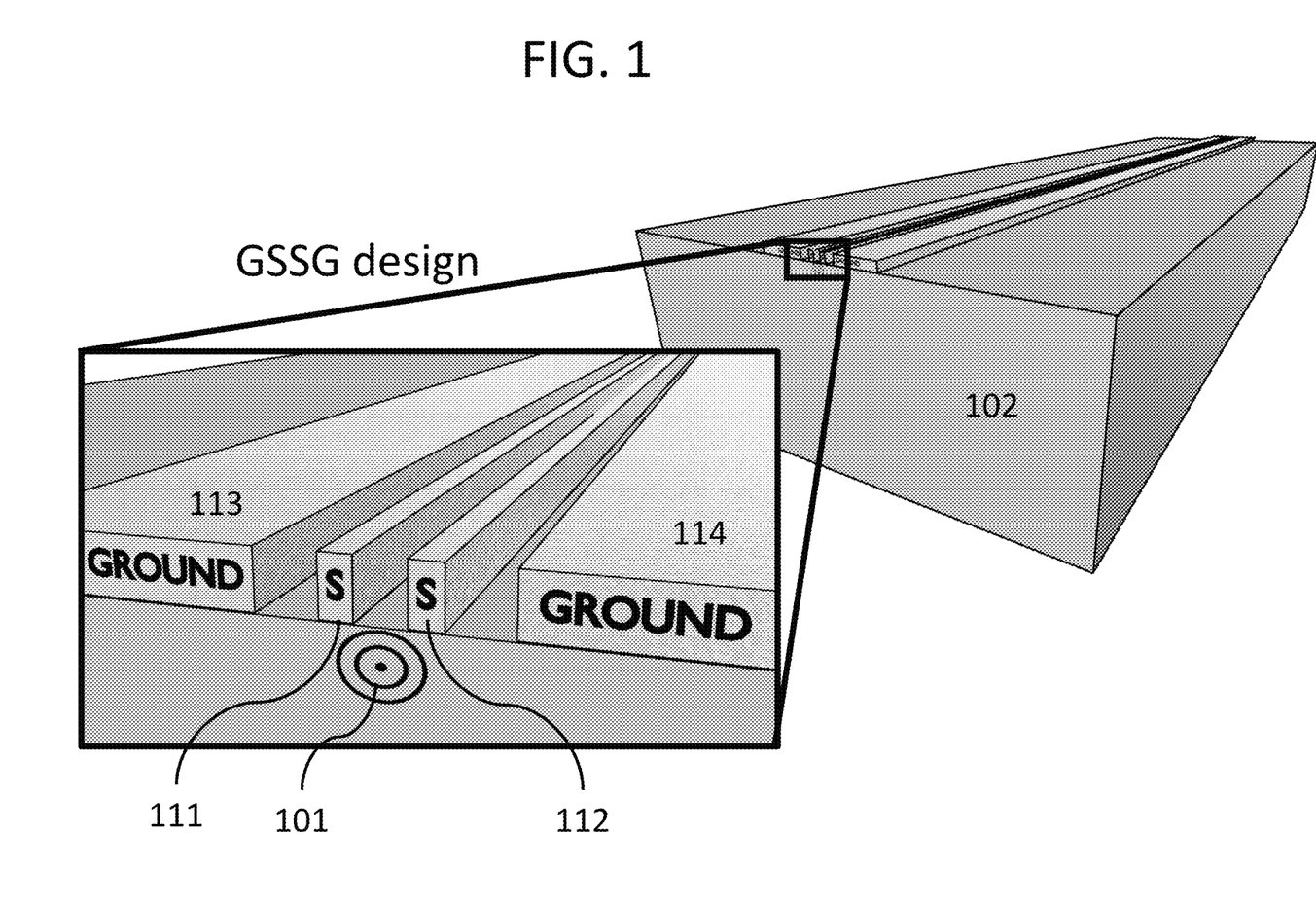
FIG. 1 illustrates a conceptual diagram of a vector modulator, according to an example embodiment.

FIG. 1 shows the conceptual diagram of the vector modulator. The design is referred to as GSSG to indicate the presence of two signal (S) electrodes placed between two ground (G) electrodes. In the FIG. 1, an optical waveguide 101 is patterned in a slab of electro-optic material 102, which may be LNB. The RF waveguide is defined by signal electrodes 111, 112, and ground electrodes 113, 114. Electric field permeating the slab of electro-optic material is produced by these electrodes when voltage is applied. As can be seen in FIG. 1, in one embodiment, the optical waveguide 101 is formed below the signal electrodes 111 and 112 in the direction perpendicular to the surface of electro-optic material 102, and between the signal electrodes 111 and 112 in the direction parallel to the surface of electro-optic material 102. As shown, the optical waveguide 101 extends beyond a surface where the signal electrodes 111 and 112 interface with the surface of the substrate formed from the electro-optic material 102. The extension is substantial enough to allow an electric field created between the two signal electrodes 111 and 112 to affect the index of refraction of the optical waveguide 101. As shown, from a transverse cross-sectional view of the signal electrodes 111 and 112 and the optical waveguide 101, the signal electrodes 111 and 112 extend from a first surface of the electro-optic material 102 away from the electro-optic material 102 in a first direction, and the optical waveguide 101 extends into the electro-optic material 102 beyond the first surface of the electro-optic material 102 in a second direction opposite the first direction. In some embodiments, the entire optical waveguide 101 is located beyond a surface where the signal electrodes 111 and 112 interface with the surface of the substrate, e.g., on an opposite side of the interface from the signal electrodes 111 and 112. The optical waveguide supports at least two polarization states of light that are orthogonal to one another. For example, depending on a shape of the waveguide, and the profile of the index of refraction, certain polarizations of light to be guided through the waveguide will propagate.

The two signal electrodes 111 and 112 may carry two independent RF signals. For example, the two independent RF signals may be produced by different sources, and/or may be separately controlled to have independently set frequencies, amplitudes, and/or phases from each other. By using two signals electrodes instead of one, it is possible to select different combinations of the RF signals (e.g., by adjusting characteristics such as frequency, amplitude, and phase), to create an electric field that has a desired amplitude and orientation (e.g., direction) to encode two independent modulation degrees of freedom for an optical beam: e.g., polarization and phase. For example, a first combination of RF signals can be chosen to cause a certain modulation of polarization and a certain modulation of phase of an optical beam; and a second combination of RF signals can be chosen that maintains the polarization while modulating the phase; or a third combination of RF signals can be chosen that maintains the phase while modulating the amplitude, etc. Therefore, different combinations of characteristics for the two applied RF signals can be combined to simultaneously, individually, and independently modulate at least two different characteristics of an optical beam (or two characteristics of two different beams). The specific encoding of the two degrees of freedom depends on the electro-optic response of the material and on the details of the modulator geometry (e.g., number, location, size, and shape of the electrodes).

In certain embodiments, the optical waveguide 101 may carry two optical beams having different polarizations. For example, one of the optical beams may have vertical polarization, i.e., the electric field of the optical beam may be predominantly oriented normal to the surface of the slab of electro-optic material 102; the other optical beam carried by the optical waveguide 101 may polarized horizontally, i.e., the electric field of this optical beam may be predominantly oriented parallel to the surface of the slab of electro-optic material 102.

Figure 2A:
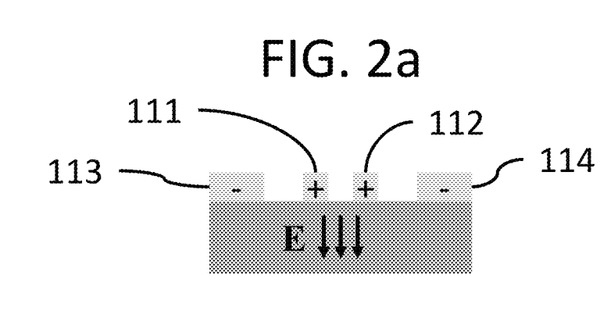
FIGS. 2a and 2b illustrate two of possible orientations of electric field due to the application of voltage to the signal and ground electrodes of the RF waveguide in the modulator, according to example embodiments.
Figure 2B:
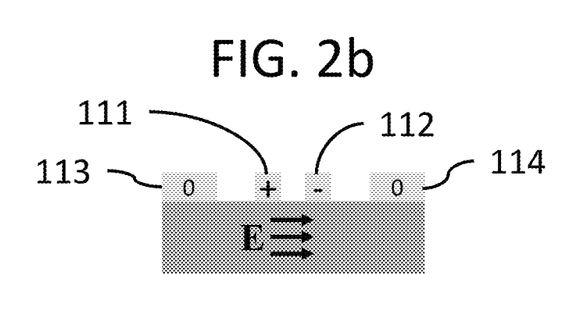

The optical beams propagating in waveguide 101 may interact with the electric field produced by the GSSG waveguide due to the application of two independent signals to the two signal electrodes 111, 112 with respect to the ground electrodes 113, 114 by virtue of the electro-optic nonlinearity of the material 102. For example, because two separate signal electrodes, that may carry two independent electrical signals, are present in the GSSG waveguide, the orientation of the modulating electric field may have any desired (predominant) orientation. FIGS. 2a and 2b show example orientations of the electric field as a function of the applied voltage to the electrodes of the GSSG waveguide. In FIG. 2a, the same electric potential is applied to signal electrodes 111 and 112, which has opposite polarity with respect to the potential applied to ground electrodes 113 and 114. Such a voltage configuration yields electric field oriented predominantly in the vertical direction in the region of the optical waveguide 101. In FIG. 2b, signal electrode 111 is placed at a positive potential with respect to ground 113 and 114, whereas signal electrode 112 is placed at a negative potential with respect to the same ground electrodes, such that signal electrodes 111 and 112 have opposite polarity with respect to one another while ground electrodes have a ground potential. Such a voltage configuration yields electric field that is predominantly oriented horizontally, or in plane with the surface of the slab of electro-optic material 102 in the region of the optical waveguide 101. Other configurations of the electric potential applied to the electrodes of the GSSG waveguide can produce other orientations of the electric field in the region of the optical waveguide 101 where the applied electric field interacts with the optical beams guided by the waveguide. In this manner, the signal electrodes are positioned to enable the generation of at least a first predominant orientation of the electric field across the optical waveguide as a result of first pair of signals applied to the signal electrodes, and at least a second, different, predominant orientation of the electric field across the optical waveguide as a result of second pair of signals different from the first pair of signals applied to the signal electrodes Therefore, according to the explanation above, the predominant orientation and strength of the applied electric field in the region of the optical waveguide 101 may depend on the voltages applied to the signal electrodes 111, 112 relative to the ground electrodes 113, 114. This applied electric field interacts with the optical beam or beams propagating in waveguide 101 to effect the modulation of the optical beam(s) with the electrical signals. As mentioned previously, the vector modulator disclosed herein may provide means to simultaneously modulate at least two distinct characteristics of an optical beam or optical beams propagating in a single optical waveguide, using two independent electrical signals applied to two signal electrodes. The two distinct characteristics may be independently modulated, such that based on the electrical signals applied to the two signal electrodes, one characteristic can be modified without affecting the other characteristic.

To expound the modulation mechanism and to establish terminology, theoretical background is presented below.

Anisotropic Electro-Optic Modulation

Figure 3:
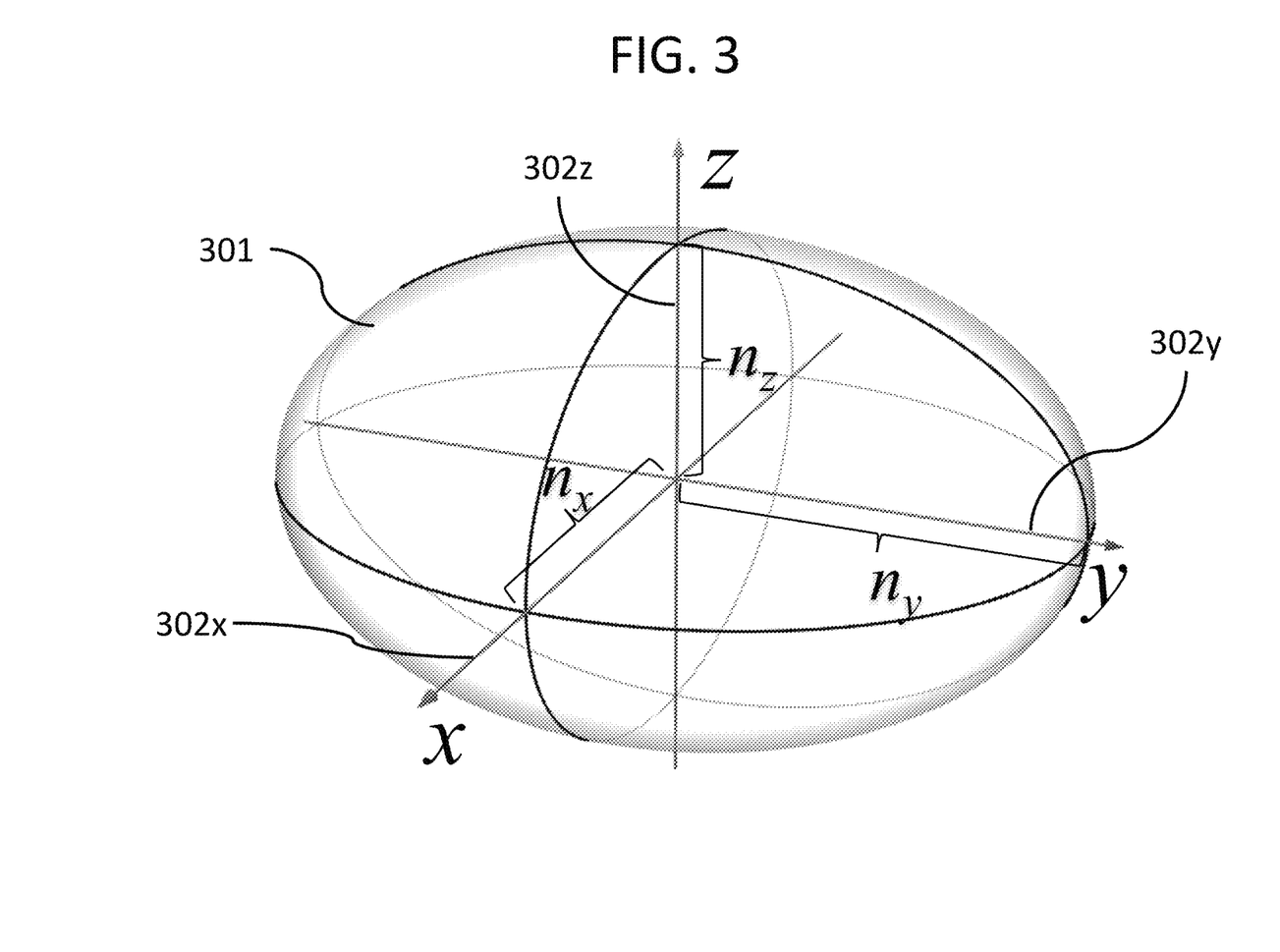
FIG. 3 shows an example of index ellipsoid.

The dielectric properties of anisotropic dielectrics, such as crystals, including LNB, may be described using a dielectric constant in a tensor forms rather than a scalar s that may be typically used for isotropic materials. As a result of the tensorial nature of the dielectric constant $\varepsilon$, the propagation of light in anisotropic materials may depend on the direction of propagation, e.g., with respect to a crystal orientation of the material and on the polarization of light. This light-propagation dependence may be described using an index ellipsoid 301, an example of which is shown in FIG. 3. An index ellipsoid is a surface in a three-dimensional space parametrized using a system of coordinates with axes x, y, and z labeled as 302x, 302y, 302z, respectively, in FIG. 3. In general, index ellipsoid may be described mathematically using the following equation $$\left(\frac{1}{n^2}\right)_1 x^2 + \left(\frac{1}{n^2}\right)_2 y^2 + \left(\frac{1}{n^2}\right)_3 z^2 + 2\left(\frac{1}{n^2}\right)_4 yz + 2\left(\frac{1}{n^2}\right)_5 xz + 2\left(\frac{1}{n^2}\right)_6 xy = 1, \quad (1)$$

where $$\left(\frac{1}{n^2}\right)_1 \text{ through } \left(\frac{1}{n^2}\right)_6$$

are coefficients determining the shape of the ellipsoid.
When the crystal is oriented along primary axes, as in the example of FIG. 3, equation (1) describing index ellipsoid may reduce to $$\left(\frac{1}{n^2}\right)_1 x^2 + \left(\frac{1}{n^2}\right)_2 y^2 + \left(\frac{1}{n^2}\right)_3 z^2 = 1. \quad (2)$$

where $$\left(\frac{1}{n^2}\right)_1 = \left(\frac{1}{n_x}\right)^2, \left(\frac{1}{n^2}\right)_2 = \left(\frac{1}{n_y}\right)^2, \left(\frac{1}{n^2}\right)_3 = \left(\frac{1}{n_z}\right)^2, \quad (3)$$

and $n_x$, $n_y$, $n_z$ are defined in FIG. 3. Equations (1) and (2) may be cast in a matrix form $$(x\ y\ z)B\begin{pmatrix}x\\y\\z\end{pmatrix} = 1 \quad (4)$$

with a proper choice of matrix B. For example, to recover Eq. (2), matrix B may take the following form $$B = \begin{pmatrix} \left(\frac{1}{n^2}\right)_1 & 0 & 0 \\ 0 & \left(\frac{1}{n^2}\right)_2 & 0 \\ 0 & 0 & \left(\frac{1}{n^2}\right)_3 \end{pmatrix}, \quad (5)$$

whereas in the general case of Eq. (1), matrix B may take the form $$B = \begin{pmatrix} \left(\frac{1}{n^2}\right)_1 & \left(\frac{1}{n^2}\right)_6 & \left(\frac{1}{n^2}\right)_5 \\ \left(\frac{1}{n^2}\right)_6 & \left(\frac{1}{n^2}\right)_2 & \left(\frac{1}{n^2}\right)_4 \\ \left(\frac{1}{n^2}\right)_5 & \left(\frac{1}{n^2}\right)_4 & \left(\frac{1}{n^2}\right)_3 \end{pmatrix}. \quad (6)$$

Figure 4A:
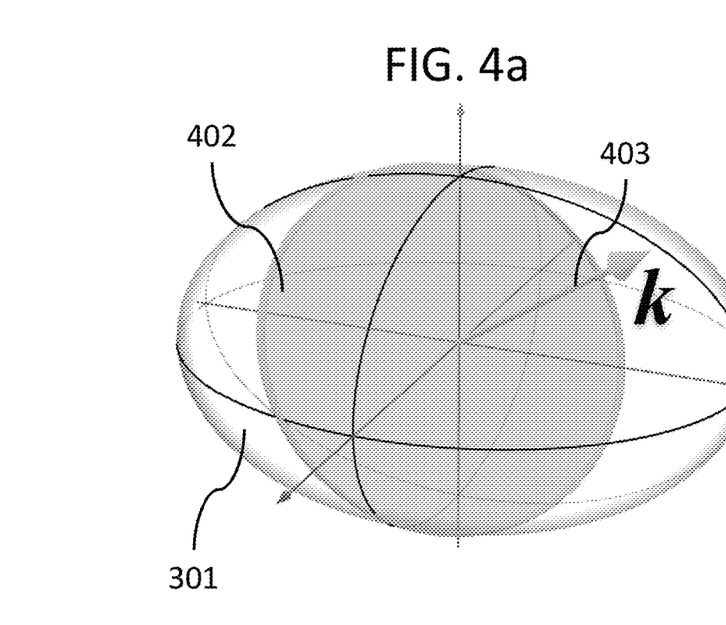
FIGS. 4a, 4b, and 4c illustrate the construction of the refractive index from the index ellipsoid, according to example embodiments.
Figure 4B:
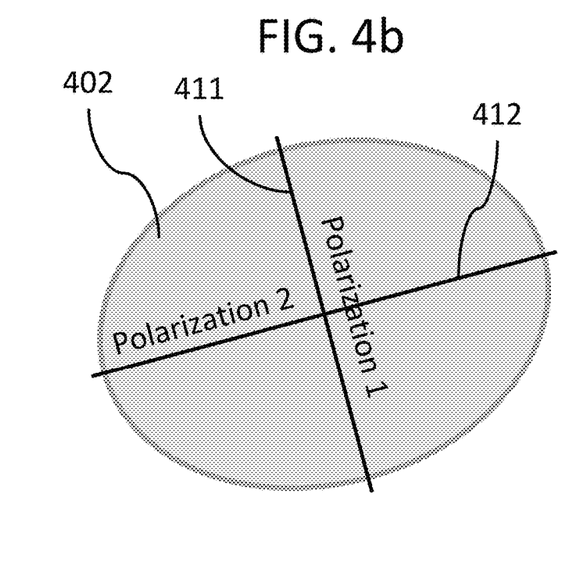
Figure 4C:
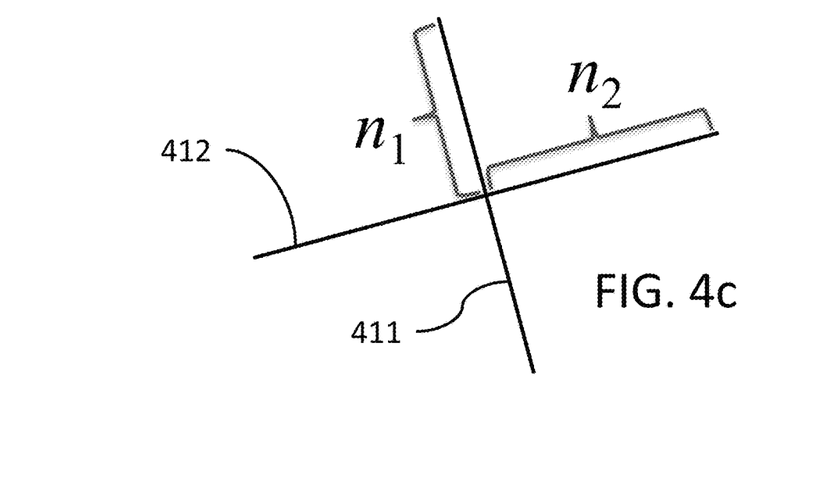

Using the index ellipsoid, the dependence of light propagation on the propagation direction and polarization may be obtained as follows, with reference to FIGS. 4a, 4b, and 4c. First, a section of the index ellipsoid 301 is obtained with a plane perpendicular to the direction of propagation 403. The section of a plane with an ellipsoid yields an ellipse 402, as shown in FIG. 4b, with minor and major axes labeled 411 and 412. The orientations of these axes correspond to the polarizations of the eigenmodes, meaning that if light is polarized along the direction of either axis 411 or axis 412, it will stay thus polarized as it propagates through the crystal along the direction k labeled as 403 in FIG. 4a. Light polarized in any other direction as it is launched into the crystal may change the polarization state as it propagates along k. The refractive index of light polarized along axis 411 is the semi-minor axis of ellipse 402 and is indicated as $n_1$ in FIG. 4c; the refractive index of light polarized along axis 412 is the semi-major axis of ellipse 402 and is indicated as $n_2$. Notably, if $n_1=n_2$, the ellipse 402 becomes a circle. In this case, the radius of the circle equals the refractive index, the eigenmodes are degenerate, and every polarization state is preserved as light propagates along k. In this case, substantially the same effective refractive index corresponds to the two polarization states of light propagating in the optical waveguide.

In electro-optic materials, such as LNB, the application of external electric field may change some or all coefficients $$\left(\frac{1}{n^2}\right)_1 \text{ through } \left(\frac{1}{n^2}\right)_6.$$

If the crystal is oriented along primary axes, see Eq. (2), and the applied electric field is $E=E_1\hat{e}_x+E_2\hat{e}_y+E_3\hat{e}_z$, where $\hat{e}_x$, $\hat{e}_y$, $\hat{e}_z$ are unit vectors along axes x, y, and z, respectively, and $E_1$, $E_2$, $E_3$ are the corresponding electric-field components, this change of index ellipsoid may be described using the matrix ($r_{ij}$) of electro-optic coefficients as follows $$\left(\frac{1}{n^2}\right)_i \rightarrow \left(\frac{1}{n^2}\right)_i + \Delta\left(\frac{1}{n^2}\right)_i, i \in \{1, K, 6\}, \quad (7)$$

$$\text{where } \Delta\left(\frac{1}{n^2}\right)_i = \sum_{j=1}^{3} r_{ij} E_j.$$

Equations (2) and (7) may be compactly written using matrix notation $$(x\ y\ z)(B+\Delta)\begin{pmatrix}x\\y\\z\end{pmatrix} = 1 \quad (8)$$

where B is given by Eq. (5), whereas $$\Delta = \sum_{j=1}^{3} E_j r_j, \text{ and } r_j = \begin{pmatrix} r_{1j} & r_{6j} & r_{5j} \\ r_{6j} & r_{2j} & r_{4j} \\ r_{5j} & r_{4j} & r_{3j} \end{pmatrix} \text{ for } j \in \{1, 2, 3\}. \quad (9)$$

To find the eigenmodes corresponding to the index ellipsoid modified by the applied electric field per Eq. (8), at a specific direction of propagation, one may rotate the system of coordinates (x, y, z) using a 3×3 rotation matrix R so chosen as to point the new (rotated) z axis in the direction of propagation. This rotation of the coordinates modifies the index-ellipsoid equation (8) as follows $$(x \ y \ z)(B+\Delta)\begin{pmatrix}x\\y\\z\end{pmatrix}=1 \rightarrow (x \ y \ z)R^T(B+\Delta)R\begin{pmatrix}x\\y\\z\end{pmatrix}=1. \quad (10)$$

For example, the rotation by angle $\Phi$ around x-axis corresponds to the following matrix R $$R_\phi = \begin{pmatrix} 1 & 0 & 0 \\ 0 & \cos\phi & -\sin\phi \\ 0 & \sin\phi & \cos\phi \end{pmatrix}. \quad (11)$$

Following the rotation shown in Eq. (8), the section ellipse, described above, may be obtained by setting z=0, i.e., by using $$(x \ y \ 0)R^T(B+\Delta)R\begin{pmatrix}x\\y\\z\end{pmatrix}=1. \quad (12)$$

In the absence of external electric field, $\Delta=0$, the matrix equation (12) for the index ellipse becomes $$\left(\frac{1}{n^2}\right)_1 x^2 + \left[\left(\frac{1}{n^2}\right)_2 \cos^2\phi + \left(\frac{1}{n^2}\right)_3 \sin^2\phi\right] y^2 = 1, \quad (13)$$

which shows that the refractive index of an eigenmode polarized in (y, z) plane for a wave propagating at an angle $\Phi$ from the z direction and in (y, z) plane is $$\left[\left(\frac{1}{n^2}\right)_2 \cos^2\phi + \left(\frac{1}{n^2}\right)_3 \sin^2\phi\right]^{-1/2}, \quad (14)$$

whereas the index of the eigenmode polarized in the x direction equals $$\left[\left(\frac{1}{n^2}\right)_1\right]^{-1/2}$$

independent of angle $\Phi$.

Vector Modulator

In the vector modulator disclosed herein, the dependence of the refractive index of an eigenmode on the direction of propagation may be taken advantage of to select the direction of propagation such that the index ellipse becomes a circle. In this case, the propagation eigenmodes are degenerate, i.e., the refractive index is independent of the polarization of the wave. If the modes are degenerate in the absence of electric field, then the application of electric field may deform the index ellipse in different ways (stretch and/or contract along different axes) depending on the direction of applied electric field.

Consider electro-optic material where $n_x$, $n_y$, and $n_z$ of FIG. 3 satisfy the following condition $$n_z < n_x < n_y. \quad (15)$$

Relation (15) may characterize intrinsic properties of the material, or may be the result of patterning an optical waveguide in the vicinity of the material surface or otherwise. For example, LNB may inherently have $n_x = n_y \neq n_z$, and hence is known as a uniaxial crystal, but patterning a waveguide near the surface of LNB, or forming a waveguide in a thin-film of LNB (e.g., where a thin-film of LNB may only allow for a first order mode of electromagnetic radiation to propagate), may effectively yield condition (15) where all the n-s are different. A thin-film of LNB may have a thickness, for example, of 0.6 μm.

Now, restrict the choice of the direction of propagation to (y, z) plane. This restriction may happen naturally if one were to choose x-cut crystal, and pattern a waveguide along the surface. Note that the equations listed below may implicitly use some identities among elements of $(r_{ij})$ valid in LNB. However, the use of LNB in the discussion should be construed as exemplary rather than limiting the scope of the invention. With relation (15), and definitions (3), one may select the direction of propagation in (y, z) plane, i.e., pattern the waveguide at an angle $\Phi$ from the crystalline z axis (towards y axis), such that the modes propagating in the waveguide are degenerate. According to Eq. (13), the condition for mode degeneracy is $$\left(\frac{1}{n^2}\right)_1 = \left(\frac{1}{n^2}\right)_2 \cos^2\phi + \left(\frac{1}{n^2}\right)_3 \sin^2\phi, \quad (16)$$

which is obtained by demanding that the coefficients in front of variables $x^2$ and $y^2$ in Eq. (13) defining the index ellipse be equal. Now, the application of electric field along the x direction (perpendicular to the surface of x-cut crystal, as in FIG. 2a) may yield the following expression for the index ellipse in lithium niobate $$\left(\frac{1}{n^2}\right)_1 x^2 + \left[\left(\frac{1}{n^2}\right)_2 \cos^2\phi + \left(\frac{1}{n^2}\right)_3 \sin^2\phi\right] y^2 + \\ 2E_x(r_{61}\cos\phi + r_{51}\sin\phi)xy = 1, \quad (17)$$

or by using the degeneracy condition of Eq. (16), $$\left(\frac{1}{n^2}\right)_1 x^2 + \left(\frac{1}{n^2}\right)_1 y^2 + 2E_x(r_{61}\cos\phi + r_{51}\sin\phi)xy = 1. \quad (18)$$

Note that in Eq. (18), the equation for a circle $$\left(\frac{1}{n^2}\right)_1 x^2 + \left(\frac{1}{n^2}\right)_1 y^2 = 1 \quad (19)$$

is modified by a cross term $2E_x (r_{61} \cos\phi + r_{51} \sin\phi)xy$ which deforms the circle to an ellipse with its major and minor axes at 45° with respect to the (x, y) coordinates. This means that in the presence of electric field along the x direction, the polarizations of the eigenmodes may be diagonal with respect to the surface-normal and in-plane directions. As a result, a mode launched with a pure TM or TE polarization, i.e., polarized along the x direction (normal to the surface), or in plane of the x-cut crystal may not retain this polarization as it propagates along the waveguide. Rather, the mode may undergo a conversion from the linear polarization, to elliptical, to circular, to elliptical, and again to linear in the direction perpendicular to the launch polarization, etc. Accordingly, a temporally-variable electric field pointing along the x direction may result in a time-variable conversion of the polarization, or polarization modulation. If this device is followed by a linear polarizer, which selects one direction onto which the polarization of the output beam is projected, amplitude modulation at the output may ensue. FIG. 2a shows the configuration of voltage applied to the GSSG electrodes that may yield electric field mostly in the x direction. Note that in the x-cut wafer illustrated here, crystalline x direction is perpendicular to the wafer surface.

For the electric field applied in plane of the sample, the field may contain components in the y and z crystalline directions since the waveguide may be generally patterned in a direction not coinciding with the crystalline directions, e.g., at an angle $\Phi$ from the crystalline z direction. This field may be mostly perpendicular to the waveguide in the electrode configuration of FIG. 1. As a result, the equation for the index ellipse may become $$\left[\left(\frac{1}{n^2}\right)_1 + (r_{13}\sin\phi - r_{22}\cos\phi)E_s\right]x^2 + \left[\left(\frac{1}{n^2}\right)_2\cos^2\phi + \left(\frac{1}{n^2}\right)_3\sin^2\phi + (r_{22}\cos^3\phi + (r_{13} + 2r_{51})\cos^2\phi\sin\phi + r_{33}\sin^3\phi)E_s\right]y^2 = 1, \quad (20)$$

which after the use of the mode degeneracy condition (16) may simplify to $$\left[\left(\frac{1}{n^2}\right)_1 + (r_{13}\sin\phi - r_{22}\cos\phi)E_s\right]x^2 + \left[\left(\frac{1}{n^2}\right)_1 + (r_{22}\cos^3\phi + (r_{13} + 2r_{51})\cos^2\phi\sin\phi + r_{33}\sin^3\phi)E_s\right]y^2 = 1, \quad (21)$$

where $E_s$ is the electric-field component in the direction perpendicular to the waveguide. Note that the equations (20) and (21) for the index ellipse in the presence of in-plane electric field contain no cross term, contrary to the corresponding equations with the electric field in the x direction, Eqs. (17) and (18). As a result, the application of the field in-plane may result in no change of the polarization state of modes launched into the TM or TE modes. Instead, the modulation of the relative phase between the TM and TE modes may be achieved since the effective refractive index may change by, generally, different amounts, depending on the specific values of components $r_{ij}$ and the angle $\phi$. Thus, according to Eqs. (20) and (21), the modulation of the refractive index, and the commensurate phase modulation, for TM mode may be $$(r_{13}\sin\phi - r_{22}\cos\phi)E_s, \quad (22)$$

whereas the modulation of the refractive index, and the commensurate phase modulation, for the TE mode may be $$(r_{22}\cos^3\phi(r_{13}+2r_{51})\cos^2\phi\sin\phi + r_{33}\sin^3\phi)E_s. \quad (23)$$

To produce the electric field mostly in plane of the wafer, the voltage applied to the electrodes in the GSSG design of FIG. 1 may be that of FIG. 2b.

Vector-Modulator Analysis Summary

The details presented above indicate the possibility to construct a vector modulator with the desired functionality using the design of FIG. 1. In particular, two independent signals applied to two signal electrodes may modulate two distinct parameters of one or two optical beams propagating in the non-linear material. For example, a first and second parameter of a first optical beam may be modulated, and a first and second parameter of a second optical beam may be modulated. The first and second parameters may be the same type of parameter in each beam (e.g., amplitude), and the second parameter may be the same type of parameter in each beam (e.g., phase). Also, two parameters related to the two beams may be modulated, such as a relative phase. A polarization of the beams may be modulated as well. Alternatively, where only one beam is modulated, different parameters of only one beam may be modulated. In the example analyzed, Eqs. (18) and (21) show that depending on the orientation of the applied field, the polarization (Eq. (18)) or the phase (Eq. (21)) of the optical beam launched as TE or TM may be modulated—including the modulation of the relative phase between two optical beams having mutually orthogonal polarizations. Both parameters may be modulated simultaneously if the applied electric field points predominantly in a direction other than the two analyzed above (e.g., other than in a direction along a plane of the wafer or perpendicular to the plane of the wafer), thereby effecting simultaneous modulation of two different characteristics of the optical beam(s).

Based on the above examples, a method can be implemented to modulate at least two distinct characteristics of an optical carrier propagating in an optical waveguide with at least two electrical signals. The method includes transmitting an optical beam that includes the optical carrier into an optical waveguide defined in electro-optic material. The method additionally includes applying the at least two electrical signals at the same time to generate an electric field in the optical waveguide. The instantaneous predominant orientation of the electric field in the optical waveguide generated by the applied at least two electrical signals depends on the relative instantaneous values of the applied electrical signals. In addition, the at least two distinct characteristics of the optical carrier propagating in the optical waveguide are simultaneously and independently modulated depending on the predominant orientation of the electric field in the optical waveguide as a result of the application of the at least two electrical signals.

Also, based on the above examples, an apparatus may simultaneously modulate two characteristics (e.g., relative phase and polarization state) of two optical beams with two electrical signals. The apparatus may include, for example, an optical waveguide 101 defined in electro-optic material 102. The optical waveguide 101 supports at least two polarization states of light that are orthogonal to one another, and thus allows light polarized in two distinct directions to pass through the optical waveguide 101. An optical input couples the two beams of light into the optical waveguide. The two optical beams have substantially different polarizations with respect to one another as they are coupled into the optical waveguide. For example, the polarization difference may vary between 10 and 170 degrees, or may range between 0 and 180 degrees without including the end points of 0 and 180 (for example, including between 1 and 179 degrees). An optical output couples light out of the optical waveguide, and two signal electrodes 111 and 112 receive modulating electrical signals. The signal electrodes 111 and 112 are positioned to produce an electric field across the optical waveguide when electrical signals are applied at the same time to the signal electrodes. The signal electrodes 111 and 112 are further positioned to enable the generation of at least a first predominant orientation of the electric field across the optical waveguide as a result of first pair of signals applied to the signal electrodes, and at least a second, different, predominant orientation of the electric field across the optical waveguide as a result of second pair of signals different from the first pair of signals applied to the signal electrodes. The two characteristics of the two optical beams may be simultaneously and independently modulated by the electric field generated in the optical waveguide due to the application of the two electrical signals to the two signal electrodes, respectively.

The apparatus described above therefore may perform a method for simultaneously modulating two distinct characteristics of two optical beams with at least two electrical signals. The method may include transmitting two optical beams into an optical waveguide defined in electro-optic material, wherein the two optical beams differ in polarization state. The method may additionally include applying the at least two electrical signals to generate an electric field in the optical waveguide, wherein the instantaneous predominant orientation of the electric field in the optical waveguide due to the applied at least two electrical signals depends on the relative instantaneous values of the applied electrical signals. Distinct characteristics of two optical beams propagating in the optical waveguide are simultaneously and independently modulated depending on the predominant orientation of the electric field in the optical waveguide as a result of the application of the at least two electrical signals.

Optical Waveguide

In some examples, a vector modulator with desired functionality may implement the design of FIG. 1 and use lithium niobate as the electro-optic material. Other electro-optic materials may be used, however, such as barium titanate. The type of waveguide patterned in lithium niobate may determine the modulation efficiency. For example, a waveguide diffused in x-cut bulk lithium niobate may result in a small value of angle $\Phi$ that yields mode degeneracy, and thus yield low modulation efficiency, since the cross-term in Eq. (17) and (18), ($r_{61} \cos \phi + r_{51} \sin \phi$), may be small for small values of $\Phi$ and for the material parameters $r_{51}$, $r_{61}$ of lithium niobate ($r_{51}$=28 pm/V, $r_{61}$=−3.4 pm/V). On the other hand, thin-film lithium niobate designs may offer increased angle $\Phi$ for mode degeneracy, and thereby commensurately increased modulation efficiency. Such modulators may be realized using a strip-loaded waveguide design where a strip of material such as silicon or silicon nitride in close proximity to the thin film lithium niobate layer may provide lateral confinement for the optical mode guiding.

The vector modulator disclosed herein may find applications in the universal transmitter disclosed in a separate application. Furthermore, it may be used as a stand-alone modulator capable of phase and amplitude modulation in a single device. Note that a conventional phase-and-amplitude modulator designed to work for a single polarization requires optical waveguide splitters and combiners within the modulator structure, typically in a nested Mach-Zehnder configuration. Such a device is sometimes called and I/Q modulator. In contrast, the design presented here requires no optical splitting or combining within the device, and the full I/Q modulation is achieved in a single optical waveguide. For example, the device may be followed by a properly oriented linear polarizer to finalize the amplitude modulation.

Terms such as "orthogonal," "parallel," "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes or natural variations that have negligible effect on operation. The term "substantially" may be used herein to emphasize this meaning, unless the context or other statements indicate otherwise. For example, items described as "substantially the same," "substantially equal," or "substantially planar," may be exactly the same, equal, or planar, or may be the same, equal, or planar within acceptable variations that may occur, for example, due to manufacturing processes. However, the term "substantially" when used in context with items being different refers to a difference beyond a negligible manufacturing variation or natural variation. Hence, the use of the term "substantially' in the context of items being different indicates the importance of the difference for the operation of the device.

Various embodiments of the invention have now been discussed in detail; however, the invention should not be understood as being limited to these embodiments. It should also be appreciated that various modifications, adaptations, and alternative embodiments thereof may be made within the scope and spirit of the present invention.

We claim:

1. An apparatus for modulating an optical carrier, the apparatus including:
    an optical waveguide defined in electro-optic material, said optical waveguide supporting at least two polarization states of light that are orthogonal to one another;
    an optical input to couple light into the optical waveguide;
    an optical output to couple light out of the optical waveguide; and
    at least two signal electrodes to receive modulating electrical signals,
    wherein the signal electrodes are both adjacent to the optical waveguide and are positioned to produce an electric field across the optical waveguide when electrical signals are applied to the signal electrodes, and
    wherein the signal electrodes are further positioned to enable the generation of at least a first predominant orientation of the electric field across the optical waveguide as a result of a first pair of signals applied to the signal electrodes, and at least a second, different, predominant orientation of the electric field across the optical waveguide as a result of second pair of signals different from the first pair of signals applied to the signal electrodes;
    whereby at least two distinct characteristics of light passing through the optical waveguide between the optical input and the optical output are simultaneously and independently modulated as a result of applying each of the first and second pair of electrical signals to the respective signal electrodes.

2. The apparatus of claim 1, wherein the two distinct characteristics of light include phase and polarization.

3. The apparatus of claim 1, wherein the electro-optic material is lithium niobate.

4. The apparatus of claim 1, wherein the electro-optic material is barium titanate.

5. The apparatus of claim 1, wherein the electro-optic material forms a thin-film layer.

6. The apparatus of claim 5, wherein the optical waveguide is defined by patterning a strip of dielectric material adjacent to the thin-film layer of electro-optic material.

7. The apparatus of claim 1, wherein the signal electrodes comprise metal traces parallel to the optical waveguide.

8. The apparatus of claim 7, wherein from a transverse cross-sectional view of the signal electrodes and the optical waveguide, the signal electrodes extend from a first surface of the electro-optic material away from the electro-optic material in a first direction, and the optical waveguide extends into the electro-optic material beyond the first surface of the electro-optic material in a second direction opposite the first direction.

9. The apparatus of claim 1, wherein each of the two polarization states of light propagating in the optical waveguide corresponds to an effective refractive index, and substantially the same effective refractive index corresponds to the two polarization states of light propagating in the optical waveguide.

10. The apparatus of claim 1, wherein the first predominant orientation of the electric field is not orthogonal to the second predominant orientation of the electric field.

11. An apparatus for simultaneously modulating two characteristics of at least one optical beam with two electrical signals, the apparatus including:
an optical waveguide defined in electro-optic material;
said optical waveguide supporting at least two polarization states of light that are orthogonal to one another;
an optical input to couple the two optical beams into the optical waveguide,
an optical output to couple light out of the optical waveguide; and
two signal electrodes to receive modulating electrical signals,
wherein the signal electrodes are both adjacent to the optical waveguide and are positioned to produce an electric field across the optical waveguide when electrical signals are applied at the same time to the signal electrodes,
wherein the signal electrodes are further positioned to enable the generation of at least a first predominant orientation of the electric field across the optical waveguide as a result of first pair of signals applied to the signal electrodes, and at least a second, different, predominant orientation of the electric field across the optical waveguide as a result of second pair of signals different from the first pair of signals applied to the signal electrodes, and
whereby the two characteristics of the at least one optical beam are simultaneously and independently modulated by the electric field generated in the optical waveguide due to the application of the two electrical signals to the two signal electrodes, respectively.

12. The apparatus of claim 11, wherein:
the at least one optical beam is two optical beams having substantially different polarizations with respect to one another as they are coupled into the optical waveguide; and
the two characteristics of the two optical beams modulated with the two electrical signals include polarization state and relative phase between the two optical beams.

13. The apparatus of claim 11, wherein the electro-optic material forms a thin-film layer.

14. The apparatus of claim 13, wherein the optical waveguide is defined by patterning a strip of dielectric material adjacent to the thin-film layer of electro-optic material.

15. The apparatus of claim 11, wherein:
the at least one optical beam is two optical beams having substantially different polarizations with respect to one another as they are coupled into the optical waveguide; and
substantially the same effective refractive index corresponds to the two polarization states of light propagating in the optical waveguide.

* * * * *